United States Patent
Cannon, III

(10) Patent No.: US 8,013,859 B2
(45) Date of Patent: Sep. 6, 2011

(54) GRAPHICAL DISPLAY FOR ILLUSTRATING EFFECTIVENESS OF RESOURCE MANAGEMENT AND RESOURCE BALANCING

(75) Inventor: Thomas C. Cannon, III, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 600 days.

(21) Appl. No.: 12/052,700

(22) Filed: Mar. 20, 2008

(65) Prior Publication Data

US 2009/0237404 A1    Sep. 24, 2009

(51) Int. Cl.
*G06T 11/20* (2006.01)
(52) U.S. Cl. .................... 345/440; 345/440.2
(58) Field of Classification Search ............... 345/440, 345/440.2; 718/1, 105; 709/226, 224; 715/736
See application file for complete search history.

(56) References Cited

U.S. PATENT DOCUMENTS

| | | | |
|---|---|---|---|
| 6,606,658 B1 * | 8/2003 | Uematsu | 709/224 |
| 2003/0006988 A1 * | 1/2003 | Alford et al. | 345/440 |
| 2004/0143664 A1 * | 7/2004 | Usa et al. | 709/226 |
| 2005/0104799 A1 * | 5/2005 | Shimizu | 345/1.2 |
| 2008/0196043 A1 * | 8/2008 | Feinleib et al. | 718/1 |
| 2008/0222632 A1 * | 9/2008 | Ueno et al. | 718/1 |
| 2010/0023940 A1 * | 1/2010 | Iwamatsu et al. | 718/1 |

* cited by examiner

*Primary Examiner* — Chante Harrison

(57) ABSTRACT

A graphical display combines multiple dimensions of information relating to resource allocation and usage by a group of computer systems and sub-systems of the computer systems. The graphical display includes a series of graphics, each indicating resource usage by one of the computer systems. In addition, each graphic has multiple sections. Each section of the graphic indicates resource usage by a sub-system that is within the computer system represented by the graphic. Each section of the graphics may also be color-coded. The color code indicates the amount of resources the associated sub-system is receiving relative to the amount of resources that has been designated for that sub-system.

18 Claims, 4 Drawing Sheets

GRAPHICAL DISPLAY FOR ILLUSTRATING EFFECTIVENESS OF RESOURCE MANAGEMENT AND RESOURCE BALANCING

BACKGROUND OF THE INVENTION

In a virtualized computer environment, virtual machines are configured to run on one or more host computers. Each virtual machine uses CPU and memory resources of one of the host computers and runs its own operating system and application programs to give the appearance that it is operating as a stand-alone computer system. The amount of CPU and memory resources for each of the virtual machines on a host computer can be designated manually by an administrator of the virtualized computer environment or automatically according to resource policies set by the administrator. In some virtualized computer environments, load balancing is enforced across multiple host computers by software that monitors resource usage on different host computers and migrates one or more virtual machines from one host computer to another, e.g., from a busy host computer to one that has excess capacity.

Currently, the ability for an administrator of a virtualized computer environment to visualize the effectiveness of load balancing and/or resource policies is limited. Many virtualized computer environments provide the administrator with a resource graph that shows overall CPU utilization for each of the host computers but displays no information about resources being provided to the individual virtual machines. Some virtualized computer environments provide several types of resource utilization information over a set of displays, each of which is tailored to present a different type of information. Such methods of conveying resource utilization information are not particularly useful because it is difficult to correlate data in the multiple displays, and it is seldom obvious which display contains relevant information.

SUMMARY OF THE INVENTION

One or more embodiments of the invention combine multiple dimensions of information relating to resource allocation and usage by a group of computer systems, e.g., host computers systems in a virtualized computer environment, in a graphical representation rendered on a single display. The graphical representation includes a series of graphics, each indicating resource usage by one of the computer systems. In addition, each graphic has multiple sections. The size of each section of the graphic indicates the resource usage by a sub-system of the computer system represented by the graphic, e.g., a virtual machine that runs on a host computer system. Each section of the graphic may also be color-coded. The color code indicates the amount of resources the associated sub-system is receiving relative to the amount of resources that has been designated for that sub-system.

Other embodiments of the invention include a computer system for monitoring and displaying resource allocation and usage by host computer systems in a virtualized computer system and one or more virtual machines that are running on each of the host computer systems. Embodiments of the invention further include a computer-readable storage medium encoded with computer-executable instructions for performing the steps of receiving and displaying resource usage information of a group of host computer systems and one or more virtual machines that are running on each of the host computer systems.

DETAILED DESCRIPTION

One or more embodiments of the invention combine multiple dimensions of information relating to resource allocation and usage by a group of computer systems in a graphical representation and render the graphical representation on a single display. In one embodiment, the group of computer systems is part of a virtualized computer system. One example of such a virtualized computer system is VMware® Infrastructure product that is commercially available from VMware, Inc. of Palo Alto, Calif.

Figure 1:
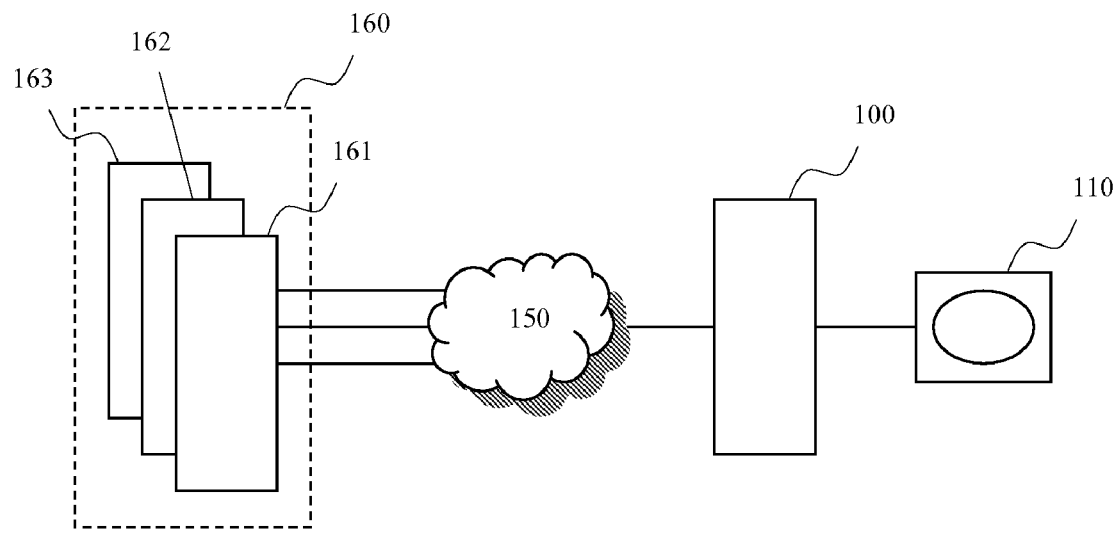
FIG. 1 is a simplified block diagram of a distributed computing environment in which one or more embodiments of the invention may be implemented.

FIG. 1 is a simplified block diagram of a distributed computing environment in which one or more embodiments of the invention may be implemented. The distributed computing environment includes a supervisory computer system 100, a display 110 associated with supervisory computer system 100, and a group of computer systems 161, 162, 163, collectively referred to as a cluster 160, that are connected over a computer network 150. Each of the computer systems depicted in FIG. 1: (a) includes conventional components of a computing device, such as a processor, system memory, and various input and output devices; and (b) processes data under the control of software. Software components typically include operating system software, software drivers, and application programs.

Each of the computer systems 161, 162, 163, hereinafter also referred to as the "host computer system," is programmed with one or more virtual machines that run on top of a software interface layer, known as a virtual machine monitor. The virtual machine monitor may run on top of the host computer system's operating system or directly on hardware components of the host computer system. Together, the virtual machines and the virtual machine monitor create virtualized computer systems that give the appearance of being distinct from the host computer system and from each other. Each virtual machine includes a guest operating system and one or more guest application programs. The guest operating system is a master control program of the virtual machine and, among other things, the guest operating system forms a software platform on top of which the guest application programs run.

Computer systems 161, 162, 163 are arranged as a cluster so that their hardware resources are aggregated and managed as if they resided on a single host computer. The virtual machines that run on cluster 160 are configured and managed through supervisory computer system 100. A virtual machine may run on any one of computer system 161, 162, 163 and may migrate to a different host computer system. In the VMware® Infrastructure product, the need for migration is determined using an automatic resource allocation software tool known as VMware DRS, and the migration is carried out by a software tool known as VMotion. The VMware® Infrastructure product, the VMware DRS allocation software tool, and the VMotion migration software tool are all commercially available from VMware, Inc. of Palo Alto, Calif.

Information about host computer system resources, e.g., CPU or memory resources, that are consumed by each of the virtual machines that run on a host computer system is collected by the host computer system and transmitted to supervisory computer system 100 over computer network 150. In one embodiment, each of the virtual machine monitors of the host computer systems determines the amount of CPU and memory resources that it is consuming, and transmits the information to the host computer system for collection and transmission to supervisory computer system 100. Supervisory computer system 100 receives this information from each of the host computer systems that are part of cluster 160 and processes the information for output onto display 110.

Figure 2:
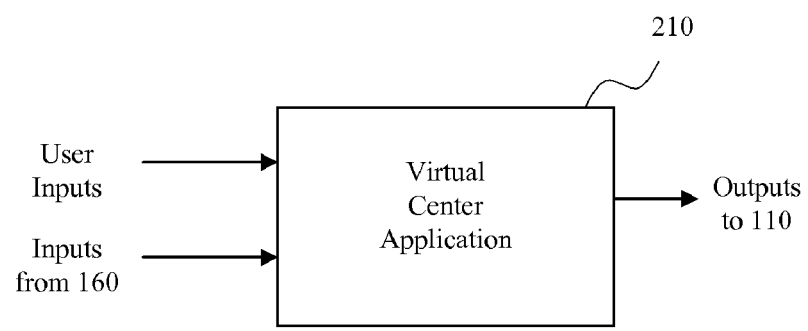
FIG. 2 is a conceptual block diagram illustrating inputs to a software component that is used to generate a graphical display according to one or more embodiments of the invention.

FIG. 2 is a conceptual block diagram illustrating inputs to virtual center application 210, a software component of supervisory computer system 100, that is used to generate a graphical display according to one or more embodiments of the invention. The graphical display is generated based on external inputs from cluster 160 and any user inputs that set resource policies for the individual virtual machines that are running on computer systems 161,162,163. If no resource policies are set, each virtual machine is allocated identical resources. The external inputs include resource (CPU or memory) usage data of each computer system, and resource usage data of each virtual machine. The resource policies are set in accordance with input parameters of an automatic resource allocation software tool, such as VMware DRS, that are selected by the administrator.

In one embodiment, for each virtual machine in cluster 160, the resource policies define the minimum and the maximum allocation of CPU and memory resources, and a number of shares allocated to the virtual machine. Higher priority virtual machines are allocated more shares than lower priority virtual machines, and the share allocation of a virtual machine in cluster 160 relative to share allocations of other virtual machines in cluster 160 determine the amount of CPU and memory sources that the virtual machine is entitled to.

The graphical display generated by virtual center application 210 includes a bar graph having one or more sections for each of computer systems 161,162,163. FIGS. 3A, 3B, 3C, and 3D are representative graphical displays that show the bar graphs generated by virtual center application 210. These graphical displays provide multiple dimensions of resource allocation and usage information. A first dimension of the resource allocation and usage information, i.e., resource usage by an entire cluster, is provided through a set of bar graphs. A second dimension of the resource allocation and usage information, i.e., resource usage by individual computer systems within the cluster, is provided through individual bar graphs for each of the computer systems within the cluster. A third dimension of the resource allocation and usage information, i.e., resource usage by individual virtual machines running on a particular host computer system, is provided through individual sections or blocks of a bar graph corresponding to its host computer system. A fourth dimension of the resource allocation and usage information, i.e., information relating to whether a particular virtual machine is being provided adequate resources relative to what it is entitled to, is provided by color-coding the individual sections or blocks of a bar graph corresponding to its host computer system. In one embodiment, a section or block of a bar graph is colored in red if resources used by a virtual machine associated with that section falls below a predetermined percentage (e.g., 50%) of what it is entitled to, and in green if the resources used by the virtual machine associated with that section is greater than a predetermined percentage (e.g., 75%) of what it is entitled to, and in yellow for anything between the first two percentages. In other embodiments, a color spectrum may be used, e.g., extending from the color green to the color red, with: (a) the color green corresponding to a case where the virtual machine is receiving 100% of the resources it is entitled to, (b) the color red corresponding to a case where the virtual machine is receiving 0% of the resources it is entitled to, and (c) colors in the color spectrum between green and red corresponding to cases where the virtual machine is receiving greater than 0% but less than 100% of the resources it is entitled to.

In FIGS. 3A, 3B, 3C, 3D, the different colors are shown as white (representing green), black (representing red), and gray (representing yellow). Also, for simplicity, a virtual machine represented by a white section is referred to as being in a green state, a black section as being in a red state, and a gray section as being in a yellow state. Further, white spaces are displayed between individual sections or blocks of bar graphs for the purpose of delineating the individual sections or blocks of bar graphs, and do not represent any resource consumption. In fact, the white spaces need not be shown at all, in which case the individual sections or blocks of bar graphs will be delineated by vertical lines.

Figure 3A:
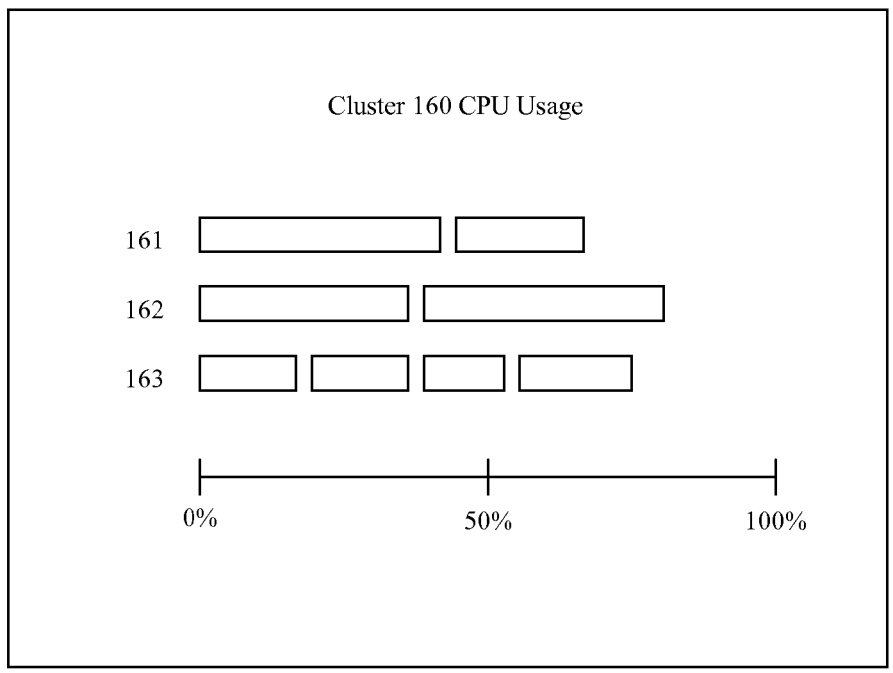
FIGS. 3A, 3B, 3C, and 3D are representative graphical displays that are generated in accordance with one or more embodiments of the invention.

In FIG. 3A, CPU usage by computer systems 161, 162, 163 in cluster 160 is represented by bar graphs. CPU usage by each of computer systems 161, 162, 163 is less than 100%. The bar graph for computer system 161 has two sections, indicating that computer system 161 has two virtual machines running thereon. Each section represents CPU usage by the corresponding virtual machine. The length of each section signifies the amount of CPU usage. Thus, referring to FIG. 3A, one of the virtual machines of computer system 161 is using about 45% of the overall CPU resources available and the other virtual machine is using about 25%. In addition, both sections are displayed in white, indicating that the two virtual machines running on computer system 161 are getting the CPU resources that they are entitled to.

The bar graph for computer system 162 has two sections and thus two virtual machines are running on computer system 162. Both sections of this bar graph are displayed in white, indicating that the two virtual machines running on computer system 162 are getting the CPU resources that they are entitled to.

The bar graph for computer system 163 has four sections and thus four virtual machines are running on computer system 163. All four sections of this bar graph are displayed in white, indicating that the four virtual machines running on computer system 163 are getting the CPU resources that they are entitled to.

Figure 3B:
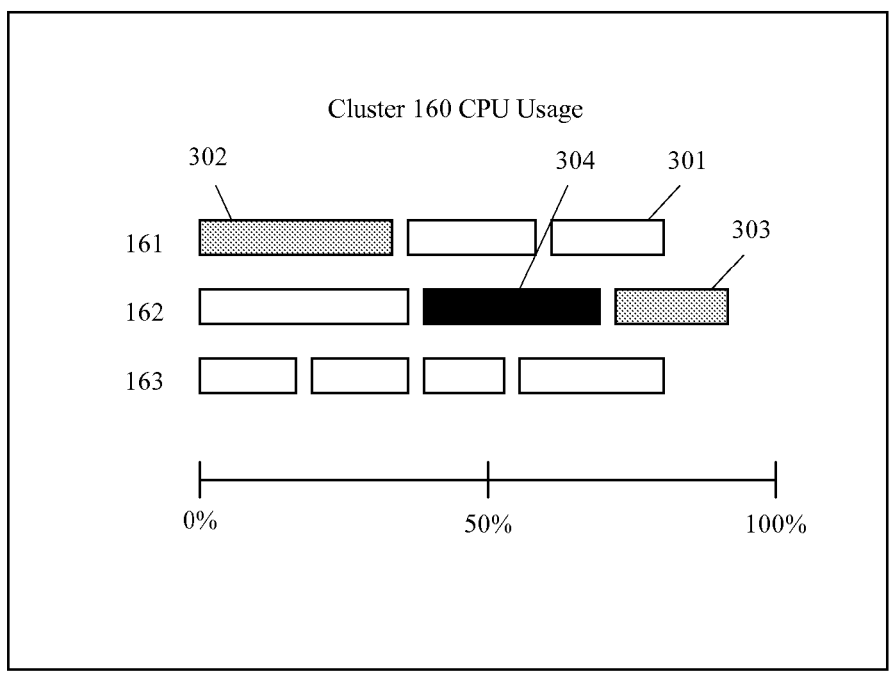

FIG. 3B is also a display of CPU usage by computer systems 161, 162, 163 in cluster 160, but after an additional virtual machine has begun running on computer system 161 and a different additional virtual machine has begun running on computer system 162. As a result of adding a virtual machine represented by section 301 to computer system 161, less CPU resources are made available to the virtual machine represented by section 302 such that this virtual machine is now in a yellow state. Similarly, as a result of adding a virtual machine represented by section 303 to computer system 162, less CPU resources are made available to the virtual machine represented by section 304 such that this virtual machine is now in a red state. In addition, the added virtual machine is itself in a yellow state.

Figure 3C:
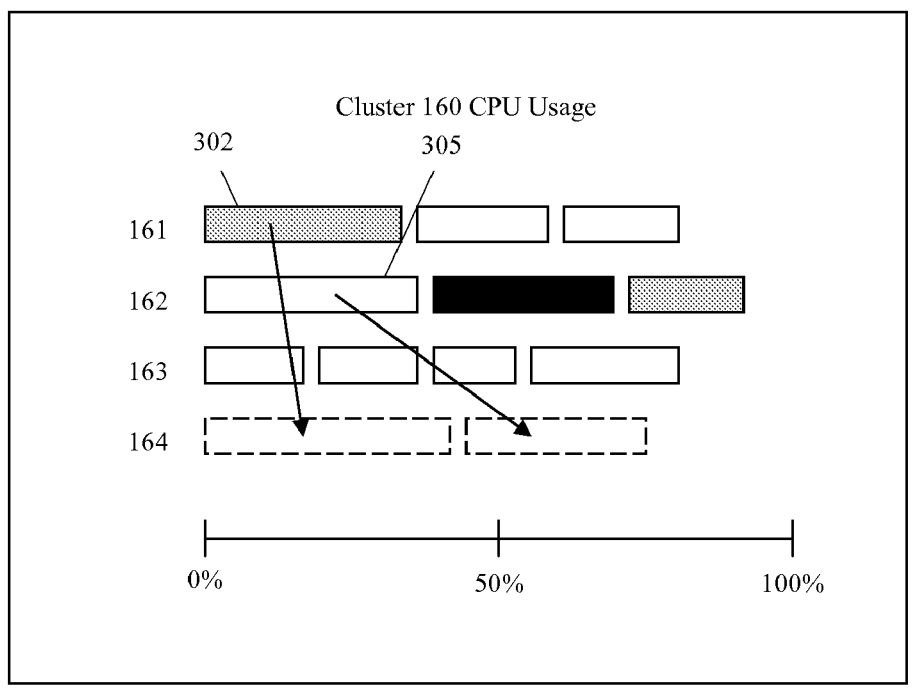
Figure 3D:
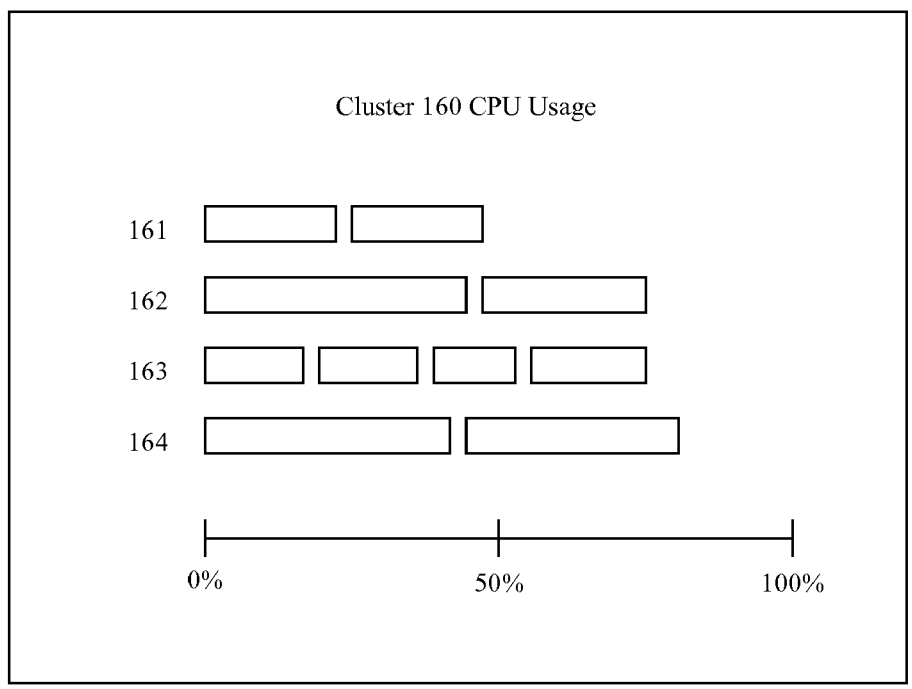

FIG. 3C illustrates how the graphical display of cluster 160 changes when new hardware, e.g., computer system 164, is added to cluster 160. When computer system 164 is added to cluster 160, virtual machines migrate from a host computer system that is busy to one that is not as directed by a load balancing software tool. In the example of the VMware® Infrastructure product, the need for resource allocation is determined by a software tool known as VMware DRS, and migration is carried out by a software tool known as VMotion. In FIG. 3C, the virtual machine represented by section 302 is migrated from computer system 161 to computer system 164, and the virtual machine represented by section 305 is migrated from computer system 162 to computer system 164. The resulting CPU usage by computer systems 161,162,163, 164 in cluster 160, after migration, is shown in FIG. 3D. In FIG. 3D, all of the virtual machines are in the green state.

Figure 4:
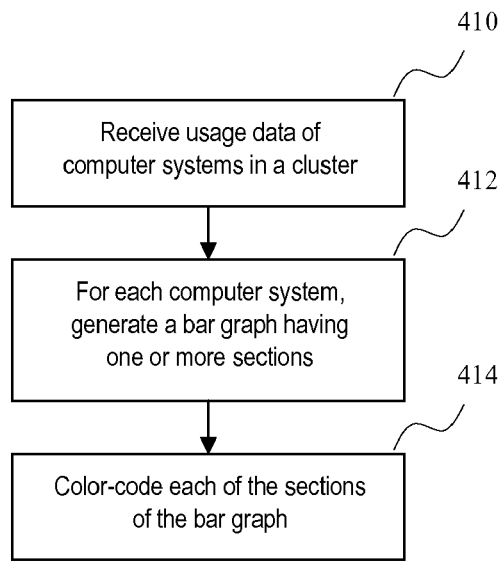
FIG. 4 is a flow diagram of method steps for generating a graphical display in accordance with one or more embodiments of the invention.

FIG. 4 is a flow diagram of method steps for generating a graphical display in accordance with one or more embodiments of the invention. In one embodiment, these steps are carried out by supervisory computer system 100 that is running virtual center application 210 and is coupled to cluster 160 over computer network 150. In step 410, supervisory computer system 100 receives resource usage data from cluster 160. The resource usage data include resource (CPU or memory) usage data of each computer system in cluster 160, and resource usage data of each virtual machine that is running on computer systems in cluster 160 as determined by the virtual machine's corresponding virtual machine monitor. In step 420, supervisory computer system 100 generates a bar graph for each computer system in cluster 160. The overall length of the bar graph for a computer system signifies the amount of resources of the computer system that is being consumed by processes running on the computer system. The processes include virtual machines, and the amount of resources of the computer system that is being consumed by each of the virtual machines is represented as sections of the bar graph as illustrated in FIGS. 3A, 3B, 3C, and 3D. In step 414, each section of the bar graph is color coded in accordance with the steps shown in FIG. 5.

Figure 5:
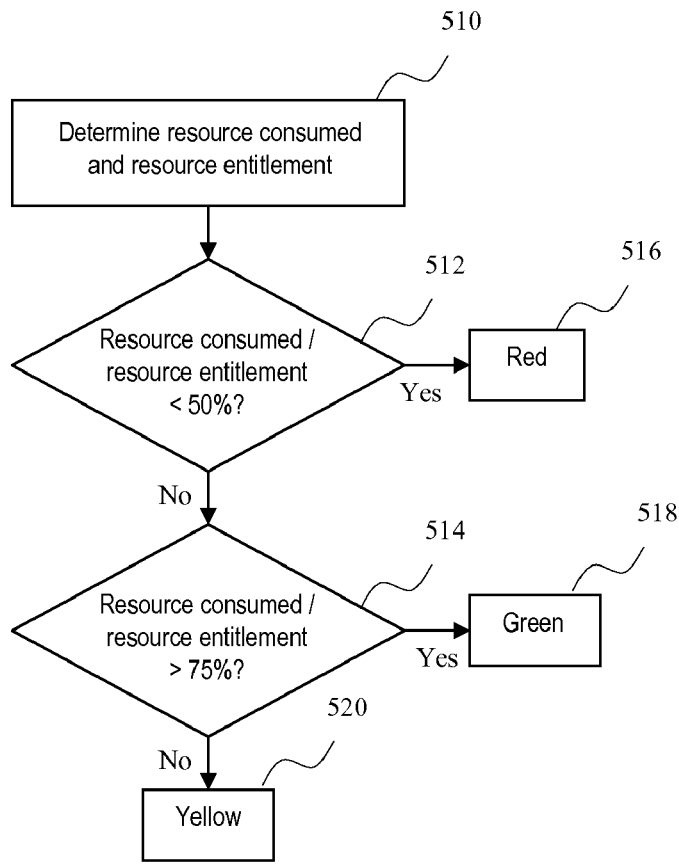
FIG. 5 is a flow diagram of method steps for color coding a graphical display in accordance with one or more embodiments of the invention.

FIG. 5 is a flow diagram of method steps for color coding a graphical display in accordance with one or more embodiments of the invention. The color coding is carried out by supervisory computer system 100 that is running virtual center application 210, and is performed for each section of the bar graphs that represent resource usage by computer systems in cluster 160. In step 510, the resource consumed by a virtual machine is determined from resource usage data received from cluster 160, and resource entitlement for that virtual machine is determined from resource policies that have been set by the administrator as described above. In steps 512 and 514, the resource consumed by virtual machine is compared against the resource entitlement for that virtual machine. If the ratio of the two is less than a predetermined value, e.g., 50%, then the section of the bar graph associated with this virtual machine is colored red (step 516). If the ratio of the two is greater than a predetermined value, e.g., 75%, then the section of the bar graph associated with this virtual machine is colored green (step 518). Otherwise, the section of the bar graph associated with this virtual machine is colored yellow (step 520).

In an alternative embodiment of the invention, resource usage by a group of web servers that serve a single web site is monitored and the resource usage information of these web servers is displayed in multiple dimensions on a single display. In this embodiment, each web server is divided into sub-systems, each of which is responsible for serving one section of the web site. The graphical display for presenting resource usage information includes a set of bar graphs, each indicating resource usage by one of the web servers. Each bar graph also has one or more sections, and each section indicates resource usage by one sub-system of a web server. The length of the section indicates the amount of resources consumed by the associated sub-system.

Color coding may also be carried out in this embodiment. For color coding, the actual page view rate of a web site section corresponding to a bar graph section is compared with a targeted page view rate for that web site section. If the ratio of the two falls below a predetermined number (e.g., 50%), the bar graph section is colored red. If the ratio of the two is greater than a predetermined number (e.g., 75%), the bar graph section is colored green. For all other ratios, the bar graph section is colored yellow.

In addition, one or more embodiments of the invention enable a system administrator to observe potential effects of migrating virtual machines in accordance with a set of recommendations by generating a pair of graphic displays, one representing a "before" snapshot of the cluster and another representing an "after" snapshot of the cluster. The "before" and "after" snapshots of the cluster would be similar to the graphical displays shown in FIGS. 3B and 3D, respectively. The recommendations may be automatically generated, e.g., by the VMware DRS tool, or manually entered by the system administrator.

In other embodiments of the invention, graphical representation may take on other forms, such as vertical bar graphs or pie graphs. In general, the graphical representation may be any form of 2-D or 3-D graphic, so long as the relative size of a graphic provides a measure of resource usage by the item that the graphic is representing. In the vertical bar graph embodiment, resource usage and allocation information is provided using vertical bar graphs in place of horizontal bar graphs. In the pie graph embodiment, resource usage and allocation information is provided using pie charts. Each pie graph corresponds to a host computer system and has multiple wedges, each corresponding to a virtual machine that is running on the host computer system and color-coded as described above for the horizontal bar graph embodiment.

While the foregoing is directed to embodiments of the present invention, other and further embodiments of the invention may be devised without departing from the basic scope thereof, and the scope thereof is determined by the claims.

What is claimed is:

1. A method for presenting information about a group of computer systems as a graphical representation rendered on a display, wherein each of the computer systems has multiple sub-systems, the method comprising:
   receiving usage data of a first computer system, the usage data indicating overall resource usage of said first computer system and resource usage of each of the sub-systems of said first computer system;
   receiving usage data of a second computer system, the usage data indicating overall resource usage of said second computer system and resource usage of each of the sub-systems of said second computer system;
   rendering the usage data of the first computer system as a first graphic on the display, wherein the first graphic is subdivided into a plurality of sections, each indicating the resource usage of one of the sub-systems of the first computer system; and rendering the usage data of the second computer system as a second graphic on the display adjacent the first graphic, wherein the second graphic is subdivided into a plurality of sections, each indicating the resource usage of one of the sub-systems of the second computer system;

wherein the first and second computer systems are host computer systems of a virtualized computer system, and the sub-systems of the first and second computer systems are virtual machines that are running on the host computer systems.

2. The method according to claim 1, wherein the usage data indicates usage of CPU resources.

3. The method according to claim 1, wherein a size of the first graphic is proportional to the total resource usage of the first computer system by the sub-systems of the first computer system and a size of the second graphic is proportional to the total resource usage of the second computer system by the sub-systems of the second computer system.

4. The method according to claim 1, wherein each sub-system of the first and second computer systems that is using resources of the first and second computer systems is represented by one of the sections of the first and second graphics, and a size of said one of the sections is proportional to the amount of resources of the first and second computer systems that have been actually allocated to said each sub-system.

5. The method according to claim 4, further comprising: determining an amount of resources designated for said each sub-system, and rendering the usage data of said each sub-system on the display in accordance with an amount of resources actually allocated to said each sub-system relative to the amount of resources designated for said each sub-system.

6. The method according to claim 5, wherein the section of the first and second graphics corresponding to said each sub-system is color-coded in accordance with an amount of resources actually allocated to said each sub-system relative to the amount of resources designated for said each sub-system.

7. The method according to claim 5, wherein the section of the first and second graphics corresponding to said each sub-system is displayed in a first color if an amount of resources actually used by said each sub-system is greater than a first predetermined percentage of the amount of resources designated for said each sub-system.

8. The method according to claim 7, wherein the section of the first and second graphics corresponding to said each sub-system is displayed in a second color if an amount of resources actually used by said each sub-system is less than a second predetermined percentage of the amount of resources designated for said each sub-system.

9. The method according to claim 1, wherein sizes of the sections of the first graphic indicate relative amounts of resources of the first computer system allocated to the sub-systems corresponding to said sections of the first graphic, and sizes of the sections of the second graphic indicate relative amounts of resources of the second computer system allocated to the sub-systems corresponding to said sections of the second graphic.

10. The method according to claim 9, wherein the sections of the first and second graphics are displayed in different colors, and a display color of a particular section is determined in accordance with an amount of resources of the first and second computer systems actually allocated to a sub-system corresponding to said particular section relative to an amount of resources of the first and second computer systems that said sub-system is entitled to.

11. A computer system for monitoring a group of computer systems, each having multiple sub-systems, the computer system comprising a processor and a display, the processor being programmed to receive usage data of the computer systems and usage data of each of the sub-systems and render them as graphics on the display, wherein each graphic is subdivided into a plurality of sections, each section indicating the resource usage of one of the sub-systems;

wherein the computer systems are host computer systems of a virtualized computer system and the sub-systems of the computer systems are virtual machines that are running on the host computer systems.

12. The computer system according to claim 11, wherein sizes of the sections of one of the graphics indicate relative amounts of resources of one of the computer systems allocated to the sub-systems corresponding to the sections of said one of the graphics.

13. The computer system according to claim 12, wherein the sections of said one of the graphics are displayed in different colors, and a display color of a particular section is determined in accordance with an amount of resources of said one of the computer systems actually allocated to a sub-system corresponding to said particular section relative to an amount of resources of said one of the computer systems that said sub-system is entitled to.

14. The computer system according to claim 11, wherein the usage data indicates usage of CPU resources.

15. A computer-readable non-transitory storage medium encoded with computer-executable instructions for performing the steps of:

receiving usage data of a first computer system, the usage data indicating overall resource usage of said first computer system and resource usage of each of the sub-systems of said first computer system;

receiving usage data of a second computer system, the usage data indicating overall resource usage of said second computer system and resource usage of each of the sub-systems of said second computer system;

rendering the usage data of the first computer system as a first graphic on the display, wherein the first graphic is subdivided into a plurality of sections, each indicating the resource usage of one of the sub-systems of the first computer system; and rendering the usage data of the second computer system as a second graphic on the display adjacent the first graphic, wherein the second graphic is subdivided into a plurality of sections, each indicating the resource usage of one of the sub-systems of the second computer system;

wherein the first and second computer systems are host computer systems of a virtualized computer system, and the sub-systems of the first and second computer systems are virtual machines that are running on the host computer systems.

16. The computer-readable non-transitory storage medium according to claim 15, encoded with computer-executable instructions for performing the further steps of determining an amount of resources designated for said each sub-system, and rendering the usage data of said each sub-system on the display in accordance with an amount of resources actually allocated to said each sub-system relative to the amount of resources designated for said each sub-system.

17. The computer-readable non-transitory storage medium according to claim 16, wherein sizes of the sections of the first graphic indicate relative amounts of resources of the first computer system allocated to the sub-systems corresponding to said sections of the first graphic, and sizes of the sections of the second graphic indicate relative amounts of resources of the second computer system allocated to the sub-systems corresponding to said sections of the second graphic.

18. The computer-readable non-transitory storage medium according to claim 17, wherein the sections of the first and second graphics are displayed in different colors, and a display color of a particular section is determined in accordance with an amount of resources of the first and second computer systems actually allocated to a sub-system corresponding to said particular section relative to an amount of resources of the first and second computer systems that said sub-system is entitled to.

* * * * *